July 27, 1954  R. B. MACPHERSON  2,684,660
WINDSHIELD CLEANER
Filed April 21, 1950
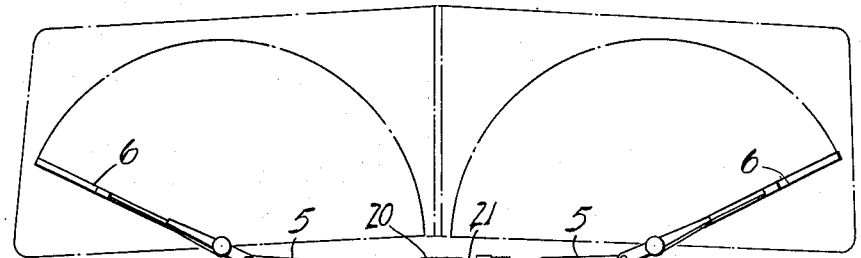
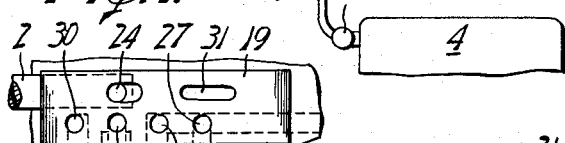
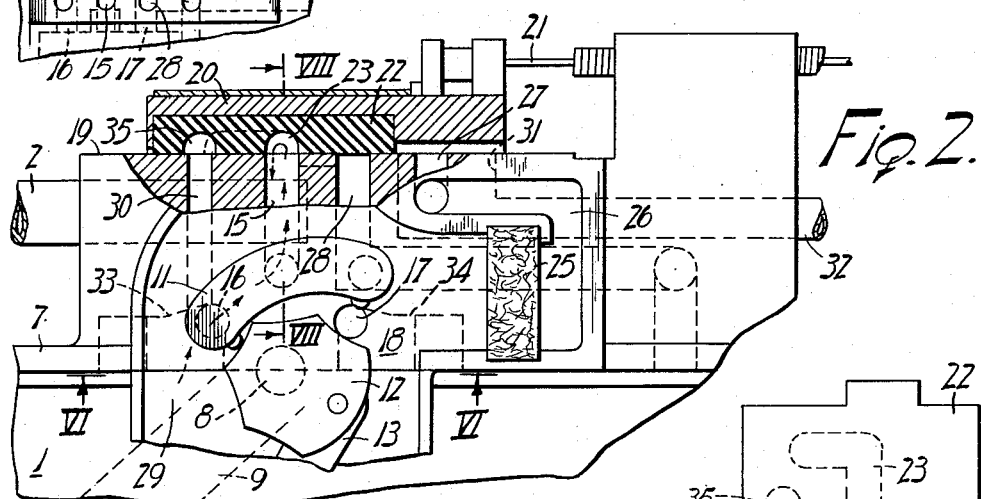
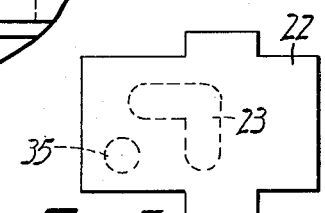
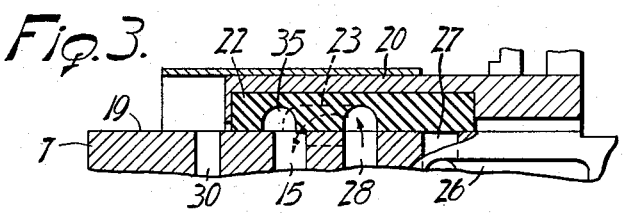
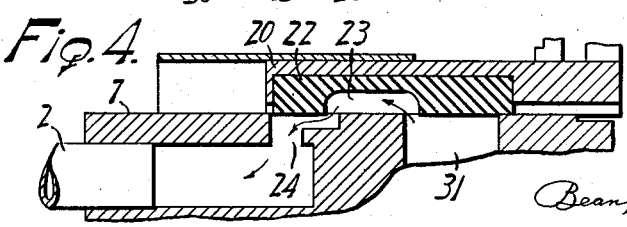
INVENTOR.
Robert B. MacPherson
Bean, Brooks, Buckley & Bean.
ATTORNEYS Patented July 27, 1954

2,684,660

UNITED STATES PATENT OFFICE 2,684,660

WINDSHIELD CLEANER

Robert B. Macpherson, Buffalo, N. Y., assignor to Trico Products Corporation, Buffalo, N. Y.

Application April 21, 1950, Serial No. 157,208

2 Claims. (Cl. 121—97)

This invention relates to the windshield cleaning art and more particularly to the power unit for imparting the back and forth movement to the wiper.

The pneumatic or suction operated motor of the self-parking type has heretofore provided a wiper movement which was faster in one direction than in the other. This uneven wiper movement was primarily caused by the fact that the motor passages to the opposite sides of the piston lacked uniformity either in capacity or in length, a condition which resulted from the use of the wiper parking passage as a motor operating or running passage.

The primary object of this invention is to provide a windshield cleaner which has uniform wiping motion and, further, one in which the conditions for wiper operation are substantially identical throughout.

The foregoing and other objects will manifest themselves as this description progresses, reference being made to the accompanying drawing, wherein Fig. 1 is a diagrammatic view depicting the improved windshield cleaner;

Fig. 2 is an enlarged fragmentary view partly in section illustrating the fluid passage arrangement of the motor;

Figs. 3 and 4 are sectional views showing the motor control valve in its parked and running positions, respectively;

Fig. 5 is a plan view of the control valve insert;

Fig. 6 is a fragmentary inverted view of the motor cover plate taken about on line 6—6 of Fig. 2, to show the chamber passages;

Fig. 7 is a plan view of the control valve seat; and

Fig. 8 is a view of the cross section about on line 8—8 of Fig. 2.

Referring more particularly to the drawing, the numeral 1 designates the pressure operated motor connected by a conduit 2 to the intake manifold 3 of the vehicle engine 4 and by the linkage 5 to the windshield wipers 6. The motor body or casing has a removable cover 7, both parts being provided with complemental bearings in which the wiper actuating shaft 8 is journaled. The piston or vane 9 is mounted on the shaft within the motor chamber 10, all in a well known manner.

The automatic valve mechanism for effecting the reverse applications of the fluid pressure differential upon the piston may comprise a valve 11 and the shaft carried cam 12 by which latter the link 13 of the usual spring snap-over arrangement (not shown) may be moved back and forth across the dead center position wherein the spring is at its maximum distention. The valve is hollow and rockable about a cover-carried tubular stub 14, Fig. 8, for connecting the suction supply port 15 alternately to the two chamber ports 16 and 17 in the valve seat 18. The supply port opens through a second valve seat 19 on which the control valve 20 is slidable, as by a flexible push-pull wire 21. The rubber facing 22 of the control valve has a channel 23 designed to connect the support port 15 to the suction line 2 through a supply passage 24 for the normal running of the motor. Therefore, when the control valve is in its running position, and the valve 11 is in the position of Fig. 2, the air flow from the left side of the motor chamber will follow the arrows into the suction line while the outside atmosphere will enter the right side of the chamber through the uncovered chamber port 17. The resulting pressure difference will force the piston clockwise until, at the end of its stroke, the valve 11 will be rocked to connect the port 17 to the passage 15 and to uncover the port 16 for reversing the pressure connections. The automatic valve mechanism is enclosed within a compartment 29 and the outside atmosphere is filtered into this compartment through a fibrous pad 25 arranged in an entranceway 26 from a normally open passage or port 27 in the valve seat 19 beneath the overhanging control valve 20.

To arrest the motor the control valve 20 will be shifted to the position of Fig. 3 wherein the channel 23 will connect the suction supply passage 24 to a parking passage 28 leading to the right side of the motor chamber. Concurrently, the control valve closes running atmospheric port 27 and uncovers a parking atmospheric passage or port 30 which admits the atmosphere to the left side of the chamber resulting in a pressure differential which pushes the piston counterclockwise and fluid locks it to hold the wipers 6 in a parked position.

Connection may be established with a windshield washer, when one is used, through an elongated port 31 and a passage 32 by withdrawing the control valve from its normal position of rest in Fig. 3 to the washer position in Fig. 4. A washer suitable for such purpose is illustrated in Patent No. 2,206,814.

The passages 33 and 34 which connect the ports 16 and 17 to the opposite sides of the motor chamber are effectively equal in capacity and in length and, consequently, the wiper motion will be uniform in both directions because the evacuation of either side and the filling of the opposite side will be uniformly accomplished. The parking atmospheric passage 30 may open into the left passage 33 for parking purposes but during motor operation it is blocked off by the rubber facing 22 which may be dished out at 35 to prevent the suction deforming the rubber into the admission port. Similarly, the parking passage 28 may open into the right passage 34, if desired, or it may be wholly separate therefrom.

By reason of the effective uniformity of the two operating passages 33 and 34 the wipers will operate at a uniform speed in both directions producing a rhythym which is not distractive to the motorist and one which is more effective in maintaining a uniformly clear field of view. The port arrangement enables a ready parking when the control valve is moved from its running position to its wiper arresting position. The construction is economical in that the cover plate with its various passages adapts itself to modern mass production methods.

Since the inventive principles are capable of assuming other physical embodiments the detailed description given herein should not be considered by way of limitation in construing the scope of the appended claims.

What is claimed is:

1. In a parking windshield cleaner motor having a chamber with a piston therein, a valve compartment for the motor having a seat with a supply port and two chamber ports therein, automatic valve means operating in the compartment to connect the supply port alternately to each of the two chamber ports and to open the unconnected chamber port to the atmosphere, a control valve having a seat with a pressure supply passage, said supply passage and said supply port opening through the control valve seat, said control valve seat also having parking suction and running atmospheric ports, and a valving member operable on the control valve seat to connect the supply passage either to the supply port or to the parking suction passage, said valving member serving to close the parking suction port and to open the running atmospheric port, when the motor is operating, and to close the running atmospheric port and to connect the parking suction port to the supply passage for parking the motor.

2. In a parking windshield cleaner motor having a chamber with a piston therein, a valve compartment for the motor having a seat with a supply port and two chamber ports therein, automatic valve means operating in the compartment to connect the supply port alternately to each of two chamber ports and to open the unconnected chamber port to the atmosphere, a control valve having a seat with a pressure supply passage, said supply passage and said supply port opening through the control valve seat, said control valve seat also having parking suction and running atmospheric ports, a filter in the running atmospheric port, such running atmospheric port and said two chamber ports opening into the compartment, and a valving member having a running position and a parking position and operable on the control valve seat to connect the supply passage either to the supply port or to the parking suction passage, said valving member when in its running position closing the parking suction port and opening the running atmospheric port and when in its parking position closing the running atmospheric port and connecting the parking suction port to the supply passage for parking the motor.

References Cited in the file of this patent

UNITED STATES PATENTS

| Number | Name | Date |
|---|---|---|
| 1,738,311 | Oishei et al. | Dec. 3, 1929 |
| 2,260,853 | Hueber | Oct. 28, 1941 |
| 2,298,734 | Buchmann | Oct. 13, 1942 |
| 2,344,949 | Rappl | Mar. 28, 1944 |
| 2,593,626 | Stoltenberg | Apr. 22, 1952 |